(12) United States Patent
Lee et al.

(10) Patent No.: US 9,487,642 B2
(45) Date of Patent: Nov. 8, 2016

(54) BIO-BASED FLAME RESISTANT THERMOSETTING BINDERS WITH IMPROVED WET RESISTANCE

(71) Applicant: Rohm and Haas Company, Philadelphia, PA (US)

(72) Inventors: Haksu Lee, Ambler, PA (US); Charles J. Rand, Philadelphia, PA (US); Barry Weinstein, Dresher, PA (US); Thomas T. Zwolak, Bensalem, PA (US)

(73) Assignee: Rohm and Haas Company, Philadelphia, PA (US)

(*) Notice: Subject to any disclaimer, the term of this patent is extended or adjusted under 35 U.S.C. 154(b) by 474 days.

(21) Appl. No.: 13/901,630

(22) Filed: May 24, 2013

(65) Prior Publication Data

US 2013/0323493 A1 Dec. 5, 2013

Related U.S. Application Data

(60) Provisional application No. 61/652,588, filed on May 29, 2012.

(51) Int. Cl.
C08K 5/17 (2006.01)
C08K 5/1545 (2006.01)
C08K 3/32 (2006.01)

(52) U.S. Cl.
CPC . *C08K 5/17* (2013.01); *C08K 3/32* (2013.01); *C08K 5/1545* (2013.01); *Y10T 428/249921* (2015.04)

(58) Field of Classification Search
USPC ........................................................ 442/327
See application file for complete search history.

(56) References Cited

U.S. PATENT DOCUMENTS

| | | | | |
|---|---|---|---|---|
| 4,369,136 A | * | 1/1983 | Robeson et al. | 524/371 |
| 5,661,213 A | * | 8/1997 | Arkens et al. | 524/555 |
| 2006/0023988 A1 | | 2/2006 | Kurtz et al. | |
| 2007/0027283 A1 | | 2/2007 | Swift et al. | |
| 2007/0123679 A1 | | 5/2007 | Swift et al. | |
| 2007/0123680 A1 | | 5/2007 | Swift et al. | |
| 2010/0301256 A1 | * | 12/2010 | Hampson et al. | 252/62 |
| 2010/0320113 A1 | | 12/2010 | Swift | |
| 2011/0039111 A1 | | 2/2011 | Shooshtari | |
| 2011/0262648 A1 | | 10/2011 | Lee et al. | |
| 2011/0263757 A1 | | 10/2011 | Rand et al. | |
| 2013/0059075 A1 | * | 3/2013 | Appley et al. | 427/222 |
| 2013/0217791 A1 | | 8/2013 | Hines et al. | |

FOREIGN PATENT DOCUMENTS

| | | |
|---|---|---|
| EP | 0020004 A1 | 12/1980 |
| EP | 0405818 A2 | 1/1991 |
| EP | 2395035 A1 | 12/2011 |
| WO | 2009/019232 A1 | 2/2009 |
| WO | 2009/019235 A1 | 2/2009 |
| WO | 2011/044490 A1 | 4/2011 |
| WO | 2011/138458 A1 | 11/2011 |
| WO | 2011/138459 A1 | 11/2011 |

* cited by examiner

*Primary Examiner* — Jennifer Chriss
*Assistant Examiner* — Kevin Worrell
(74) *Attorney, Agent, or Firm* — Andrew E. C. Merriam

(57) ABSTRACT

The invention provides aqueous thermosetting binder compositions exhibiting both of improved flame retardation and wet tensile strength comprising a reducing sugar, a diprimary diamine or a polyprimary diamine, a phosphorus acid salt and from 3 to 20 wt. %, based on total solids, of an aqueous polymeric polyacid solution polymer containing phosphorus or its salt, wherein the aqueous thermosetting binder composition comprises from 0.7% P (s/s) to 5% P (s/s).

10 Claims, No Drawings

BIO-BASED FLAME RESISTANT THERMOSETTING BINDERS WITH IMPROVED WET RESISTANCE

The present invention relates to aqueous formaldehyde-free thermosetting binders from carbohydrates and amines, a phosphorus source and an aqueous polymeric polyacid solution polymer which suppress flame propagation and provide improved water resistance properties, for example, in bound mineral wool insulation products.

Thermosetting formaldehyde condensate resins, such as phenol formaldehyde (PF), urea formaldehyde (UF) or melamine formaldehyde (MF), although water resistant when cured will emit formaldehyde, a toxin, in process or in use. Recent proposed formaldehyde-free thermosetting binder compositions comprise melanoidin forming binders of one or more reducing sugar, one or more ammonia compound either with a polycarboxylic acid or in the form of a mineral acid ammonia salt, for example, ammonium bicarbonate. The first generation of such formaldehyde free thermosetting resins can be used in many applications previously dominated by formaldehyde thermosets, such as insulation, wood composites and laminate and fiberglass mat products. However, such carbohydrate containing thermosetting resins, once applied and cured provide coated substrates with inadequate ability to resist wetting. In addition, reducing sugar (i.e. dextrose) and amine thermosetting formulations can support a flame during combustion. Because thermosets are used for structural and thermal insulating building products such as, fiberglass insulation, ceiling tiles wall panels, etc, it is highly desirable that thermosets do not support flame propagation. Most desirable are thermosetting formulations that suppress flame propagation.

Recently, US2010030125, to Hampson et al., discloses aqueous reducing sugar, ammonium salt inorganic acid precursor thermosets and finds that organic acid monomers can limit damage caused to substrates by punking, an exothermic reaction of an organic binder that persists after cure due to inability of heat to escape. Hampson discloses that inorganic salts and organic polycarboxylic acid monomers can help curtail punking and flame hazards. Nevertheless, the Hampson binders have a fairly high cost in use and provide products with limited water resistance.

In accordance with the present invention, the inventors have sought to solve the problem of providing a formaldehyde-free thermosetting binder formulation of reducing sugars and amines which give excellent mechanical properties, especially wet strength when cured, do not support flame propagation and lower binder costs in use.

STATEMENT OF THE INVENTION

In accordance with the present invention, aqueous thermosetting binder compositions that suppress flame propagation and have a low cost in use which comprise one or more reducing sugar having at least one aldehyde or ketone group, one or more polyprimary amine, preferably, a diprimary diamine, one or more phosphorus acid salt, preferably, ammonium phosphate, and a polymeric polyacid aqueous solution polymer containing phosphorus.

1. The aqueous compositions may comprise i) from 50 to 87 wt. %, preferably, from 65 to 85 wt. %, based on total solids, of reducing sugar, preferably dextrose, ii) diprimary diamine or a polyprimary diamine, preferably a diprimary diamine, such as hexamethylene diamine (NMDA), in a ratio of from 1.1:1 to 0.3:1, preferably, from 1.0:1 to 0.4:1.0 moles of primary amine per mole of the reducing sugar, the ratio based on solids, iii) from 0.5 to 15 wt. %, based on total solids, preferably, from 2 to 12 wt. % of a phosphorus acid salt, preferably an ammonium salt, and iv) from 3 to 20 wt. %, preferably, from 4 to 15 wt. %, based on total solids, of an aqueous polymeric polyacid solution polymer containing phosphorus or its salt, preferably, with a phosphinate endgroup, wherein the composition comprises at least 0.7% P (s/s), preferably at least 1.0% P (s/s), and up to 5% P (s/s), preferably, up to 2.5% P (s/s).

2. The compositions of 1 may further comprise from 0.02 to 5 wt %, based on total solids, of a non-phosphorus containing flame retardant such as, for example, an organic bromine compound. Preferably, the non-phosphorus containing flame retardant is water soluble.

3. The compositions of 1 or 2 may further comprise one or more stabilizer, such as, for example, the a stabilizer acid or salt having a pKa of 8.5 or less, preferably 7.5 or less.

4. The compositions of any of 1, 2 or 3 may further comprise from 1 to 25 wt. %, based on total solids, preferably 20 wt. % or less, of a polysaccharide having a dextrose equivalent number of from 5 to 30, such as maltodextrin (*J. Food Sci.*, Vol. 74, pp. C34-C40, 2009).

5. In any of the compositions of 1 to 4, the one or more reducing sugar is, preferably, a 5-carbon or a 6-carbon monosaccharide such as dextrose (glucose) and xylose.

6. In another aspect of the present invention, methods of using any of the aqueous thermosetting binder compositions 1 to 5 comprise applying the binder compositions to or mixing them with a substrate and then heating the thus treated substrates or mixtures to cure the binder, for example, at from 100 to 400° C. Suitable substrates may include fibers, slivers, chips, particles, films, sheets, and combinations thereof. Suitable substrate materials may include, for example, glass, glass fiber, stone, stone fibers, composites and composite fibers or of organic and inorganic substrates, wood, or woody materials.

7. In another aspect, the present invention comprises a fiber matt containing a cured binder resulting from applying the compositions of any of 1 to 5 thereto, wherein the density of the fiber matt is from 5 kg/m$^3$ to 220 kg/m$^3$ (units). As used herein, the phrase "aqueous" or includes water, and mixtures composed substantially of water and water-miscible solvents.

As used herein, the phrase "based on the total solids" refers to weight amounts of any given ingredient in comparison to the total weight amount of all of the non-volatile ingredients in the binder (e.g. saccharide(s), primary amines, silanes, solution polymer(s), stabilizers etc).

As used herein, the phrase "percent phosphorus or sulfur" or "% P or S (s/s)" refers to the percentage calculated by taking the weight (grams) of the phosphorous or sulfur compound added to the binder and dividing by the formula molecular weight of the phosphorus or sulfur compound, then multiplying by the elemental molecular weight of phosphorus or sulfur and, finally, dividing the value thus obtained by the total solids in the formulation and multiplied by 100.

As used herein the "pKa" of a stabilizer will be treated as the pKa of the most acidic proton of an acid stabilizer or the lowest pKa of the acid or salt stabilizer, i.e. the pKa of the strongest proton or base conjugate is understood.

As used herein, the term "poly(primary amine)" means any compound having three or more primary amine groups, such as tris(2-aminoethyl)amine and polyethyleneimine.

As used herein, the phrase "solution polymer" refers to a polymer that when combined with water or aqueous solvent forms a solution.

As used herein, the phrase "s/s" refers to a solids to solids ratio.

As used herein, the phrase "substantially formaldehyde-free" refers to compositions free from added formaldehyde, and which do not liberate substantial formaldehyde as a result of drying and/or curing. Preferably, such binder or material that incorporates the binder liberates less than 100 ppm of formaldehyde, more preferably less than 50 and most preferably less than 25 ppm of formaldehyde, as a result of drying and/or curing the binder.

As used herein, unless otherwise indicated, the term "weight average molecular weight" refers to the molecular weight of a substance as determined by size exclusion gel chromatography (SEC).

As used herein, "wt. %" or "wt. percent" means weight percent based on total binder solids of the binder composition as mixed, and prior to any cure. Dehydrated reducing sugars will be considered uncured in the form they are added to the compositions.

The singular forms "a," "an," and "the" include plural referents unless the context clearly dictates otherwise. Unless defined otherwise, technical and scientific terms used herein have the same meaning as is commonly understood by one skilled in the art.

Unless otherwise indicated, any term containing parentheses refers, alternatively, to the whole term as if no parentheses were present and the term without that contained in the parentheses, and combinations of each alternative. Thus, the term "(meth)acrylic" encompasses, in the alternative, acrylic or methacrylic, or mixtures thereof.

The endpoints of all ranges directed to the same component or property are inclusive of the endpoint and independently combinable. Thus, for example, a disclosed range of at least 0.7% P (s/s), preferably at least 1.0% P (s/s), and up to 5% P (s/s), preferably, up to 2.5% P (s/s) means any and all of from 0.7 to 1.0% P (s/s), from 0.7 to 5% P (s/s), from 0.7 to 2.5% P (s/s), from 1.0 to 5% P (s/s), from 1.0 to 2.5% P (s/s) and from 2.5 to 5% P (s/s).

Unless otherwise indicated, conditions of temperature and pressure are room temperature (~20-22 ° C.) and standard pressure, also referred to as "ambient conditions". The aqueous binder compositions may be dried under conditions other than ambient conditions.

The binders of the present invention and products resulting from these binders have a combination of hot-wet strength, storage stability at high solids to manage shipping costs, and satisfactory performance in vertical flame test. The binders exhibit an excellent balance of all of these properties with added phosphorus acid salt and a polymeric polyacid aqueous solution polymer containing phosphorus.

The phosphorus acid salt of the present invention may comprise divalent metal salts, alkali metal salts and ammonium salts of phosphorus containing acids, such as, for example, ammonium dihydrogen phosphate, potassium tripolyphosphate, ammonium tripolyphosphate, diammonium hydrogen phosphate, ammonium pyrophosphate alkali metal hypophosphite, and alkali metal hydrogen phosphonate, mono and di alkali metal phosphonates, alkylphosphonic and arylphosphonic or phosphinic acids including their alkali metal salts. Preferably, such phosphorus acid salts are ammonium salts that will react in with the reducing sugars.

The polymeric polyacid aqueous solution polymer containing phosphorus may comprise any solution (co)polymer of an ethylenically unsaturated carboxylic acid, or its salt, such as acrylic, methacrylic, itaconic or maleic acids. Such polymers can readily be polymerized in aqueous solution with from 1 to 20 wt. %, based on total solids (monomer and catalyst), of a hypophosphite catalyst or its salt, such as sodium hypophosphite. Suitable polymeric polyacids are polyacrylic acids or polymethacrylic acids with hypophosphite or phosphinate groups, preferably as end groups, more preferably, polyacrylic acids. Preferably, the aqueous solution polymers have weight average molecular weights of from 600 to 8,000 and, more preferably, 5,000 or less.

The aqueous binder composition of the present invention comprises one or more reducing sugar, which may be a mono-saccharide, di-saccharide, mixtures comprising oligosaccharides or higher saccharides and reducing sugars, such as from plant and woody feedstocks, and mixtures thereof. A reducing sugar herein is any sugar that has an aldehyde or a ketone in its open chain form. This allows the sugar to react with an amine producing brown pigments characteristic of the "Browning" or Maillard Reaction. A sugar may be a reducing sugar when its anomeric carbon (the carbon linked to two oxygen atoms) is in the free form. Sugars may occur in a chain as well as a ring structure and it is possible to have an equilibrium between these two forms. Further, some keto sugars are reducing sugars because they may be converted to an aldehyde via a series of tautomeric shifts to migrate the carbonyl to the end of the chain. This pathway could become accessible during the thermal curing process.

Reducing sugars include all monosaccharides, whether aldose (containing an aldehyde) or ketose (containing a ketone). Reducing sugars include glucose, xylose, fructose, glyceraldehydes, lactose, arabinose and maltose. Accordingly, the reducing sugar component of the present invention may be a monosaccharide in its aldose or ketose form, including a triose, a tetrose, a pentose, a hexose, or a heptose. Glyceraldehyde and dihydroxyacetone are considered to be aldose and ketose sugars, respectively. Examples of aldotetrose sugars include erythrose and threose; and ketotetrose sugars include erythrulose. Aldopentose sugars include ribose, arabinose, xylose, and lyxose; and ketopentose sugars include ribulose, arabulose, xylulose, and lyxulose. Examples of aldohexose sugars include glucose (for example, dextrose), mannose, galactose, allose, altrose, talose, gulose, and idose; and ketohexose sugars include fructose, psicose, sorbose, and tagatose. Ketoheptose sugars include sedoheptulose. Most disaccharides are also reducing sugars. Other natural or synthetic stereoisomers or optical isomers of reducing sugars may also be useful as the reducing sugar component of the aqueous binder composition; for example, dextrose, which is one of the optical isomers of glucose. The reducing sugar component of the aqueous binder composition optionally may be substituted, for example with hydroxy, halo, alkyl, alkoxy, or other substituent groups; for example, dihydroxyacetone is a suitable keto substituted ketose. In addition, the reducing sugar can comprise a dehydrated form of a reducing mono- or di- saccharide, such as, hydroxymethyl furfural from dehydrogenated glucose.

The reducing sugars optionally may be substituted, for example, with hydroxy, halo, alkyl, alkoxy, carbonyl or other substituent groups.

Suitable reducing sugars may include, for example, fructose, glyceraldehydes, lactose, arabinose, maltose, glucose, dextrose, xylose and levulose. Further, a number of suitable reducing sugar sources may be used, such as corn syrup, high fructose corn syrup, hemicellulosics from corn cob, de-lignified wood and bamboo, and other fructose, xylose, and dextrose equivalents.

Preferred reducing sugars are 5-carbon and 6-carbon reducing sugars. The 5-carbon reducing sugars may be in the form of admixtures containing polysaccharides having a higher formula weight, such as plant feedstocks containing 5-carbon reducing sugars or other arabinoxylan feed stocks which can generate 5-carbon sugars. These may include, for example, fermented or chemically treated hemicellulose, e.g. from wood or bamboo, enzymatically digested wheat bran, enyzmatically digested corn cob, enzymatically digested corn fiber, and acid hydrolysis products of any of these plant feedstocks.

To reduce their costs in use, the aqueous binder compositions may further comprise a polysaccharide having a dextrose equivalent number of from 5 to 30, preferably, from 7 to 23, such as dextrins, e.g. maltodextrins, gums, gellans or hydrolyzed or enzymatically digested starches. Suitable amounts of such polysaccharides range from 7 to 45 wt. %, based on total solids, preferably, up to 30 wt. %.

The aqueous binder compositions of the present invention comprise one or more diprimary diamines or primary amine group containing compounds, including, for example, diprimary diamines, such as lysine and 1,6-hexamethylene diamine (HMD), and poly(primary amines), such as polyamines having a weight average molecular weight of 5,000 or less, preferably 3,800 or less, or, more preferably, 2,500 or less, e.g. polyethyleneimines, and reducing sugars chosen from reducing mono- and di-saccharides, their natural or synthetic stereoisomers or optical isomers, hydroxy, halo, alkyl, alkoxy or carbonyl substituted reducing mono and di-saccharides, and dehydrated forms of reducing mono and di-saccharides.

Preferred diprimary diamines or oligo(primary amine)s may have an amine equivalent weight of 400 or less, preferably 200 or less.

Other diprimary diamines may be chosen from aminoguanidine and oligomeric diprimary diamines.

The poly(primary amine)s may comprise polymers having 10 wt. % or more, or, preferably, 20 wt. % or more, of primary amine groups, such as ethylamines.

Suitable primary di-amines and polyprimary polyamines may include, for example, alkyl diprimary or higher primary diamines, such as aliphatic primary diamines, such as aminoguanidine and its salts, e.g. aminoguanidine hydrochloride, putrescine, n-alkylenediamines, like ethylene diamine, hexamethylene diamines, and other alkylene di-amines; cycloaliphatic primary diamines, such as, for example, di-aminoethylpiperazine; primary amine functional amino acids, such as lysine and aminoglycine; and aromatic di-primary amines, such as, for example, bis-(aminomethyl)cyclohexane (bisAMC), m-xylenediamine (MXD); polyamine polymers of the desired molecular weight, such as polyethyleneimines, polyethylenimine containing copolymers and block copolymers having 10 wt. % or more of primary amine groups, (co)polymers of n-aminoalkyl (meth)acrylates, such as aminoethyl methacrylate, polyguanidines, and any other (co)polymer which has at least 10 wt. %, preferably 20 wt. %, of primary amine groups.

The stabilizer may be an organic stabilizer or an inorganic stabilizer. Organic stabilizers may be chosen from a monocarboxylic acid, a dicarboxylic acid , a $C_{12}$ to $C_{36}$ fatty acid, an acid functional $C_{12}$ to $C_{36}$ fatty acid ester, an acid functional $C_{12}$ to $C_{36}$ fatty acid ether, and mixtures thereof, preferably, a monocarboxylic acid, an acid functional fatty acid ester compound, such as but not limited to mono- and di-glycerides, an acid functional fatty acid ether compound. Inorganic stabilizers may be chosen from a mineral acid, a mineral acid amine salt, a mineral acid ammonia salt, and a Lewis acid, preferably an aluminum Lewis acid, and mixtures thereof. Preferably, the inorganic stabilizer is an amine or ammonium salt of an inorganic acid, such as ammonium bicarbonate, and amine sulfates. More preferably, the stabilizer is a fugitive acid stabilizer which is volatile under use conditions, such as, for example, acetic acid, ammonium bicarbonate and citric acid. Any of the stabilizers may also be mixed with a fatty acid, a fatty acid ester, a fatty acid ether compound.

For water resistant applications, suitable organic stabilizers can be any $C_{12}$ to $C_{36}$, preferably, $C_{12}$ to $C_{24}$, fatty acid, or any acid functional a $C_{12}$ to $C_{36}$, preferably, $C_{12}$ to $C_{24}$ fatty acid ether or ester. Such molecules can be hydrolyzed from any natural source, such as a vegetable, plant or animal oil. Suitable compounds or molecules may be unsaturated fatty acids, such as oleic and linoleic acids or saturated acids, such as stearic acids. The term "fatty acid" includes both saturated fatty acids such as but not limited to coconut acids and unsaturated fatty acids such as oleic linoleic acid and a-linolenic acid. Examples include, but are not limited to, coconut acids from coconut oil, myristic acids from palm kernel oil, acids from nutmeg butter, and acids from flax oil, cottonseed and corn oil. Preferably, the stabilizer is a mixture of a $C_{12}$ to $C_{36}$ fatty acid, an acid functional $C_{12}$ to $C_{36}$ fatty acid ester, an acid functional $C_{12}$ to $C_{36}$ fatty acid ether with any other stabilizer.

Suitable inorganic stabilizers may include, for example, Lewis acids, such as aluminum sulfate mineral acids, like sulfuric acid; amine acid salts and ammonia acid salts. The Lewis acids useful in the present invention include metal salts, such as aluminum salts but do not include alkali(ne) metal salts, iron salts, or zinc salts. Preferably, the inorganic stabilizer is ammonium bicarbonate, sulfuric acid, ammonium nitrate or aluminum sulfate.

Suitable organic stabilizers may include, for example, any such compound or material which can be dispersed in aqueous media, such as, for example, mono- and di- carboxylic organic acid stabilizers, e.g. acetic acid, butyric acid and adipic acid; fatty acids, acid functional fatty acid esters or ethers. Preferred organic stabilizers are acetic acid, adipic acid and fatty acids, such as coconut acids and oleic acids.

The amount of the stabilizer used is inversely proportional to the pKa of the stabilizer compound. Preferred stabilizers have a pKa of 7.5 or less, or, more preferably, 7.0 or less. Stabilizers can be used in amounts of from 0.5 to 40 wt. %, based on total solids, preferably, 15 wt. % or less.

The compositions of the present invention may or may not be in concentrated form, having a total solids content of 10 wt. % or higher, or 20 wt. % or higher, preferably, 30 wt. % or more, or, more preferably, 45 wt. % or more, or up to 90 wt. %, or, preferably up to 70 wt. %. Preferably, the compositions in concentrated form (≥30 wt. % solids) comprise one or more stabilizers.

The aqueous binder compositions may further comprise one or more capping agent, such as a titanate, zirconate or aluminate, for example titanium lactate. Such capping agents may be used in the amount of from 0.5 to 5 wt. %, based on the total binder solids.

The aqueous binder compositions may further comprise one or more reducing agent to limit exotherm during cure, such as, for example, a (meta)bisulfite or a vicinyl diol, such as glycerin, ethylene glycol and propylene glycol.

The aqueous binder compositions may further comprise one or more extender such as, for example, lignins, lignocellulosics, starch, protein, such as soy protein or defatted soy flour, and vegetable oils.

The aqueous binder compositions may further comprise 0.2 wt. % or more, or, preferably up to 5 wt. %, based on the total binder solids, of an organosilane. Examples of suitable silanes comprise coupling agents such as, for example, Silquest™A-187 (manufactured by GE Silicones-OSi Specialties, located in Wilton Conn.); other amino silanes such as 3-aminopropyl dialkoxysilanes and 3-(2-aminoethyl) aminopropylsilanes; 3-aminopropylsilsesquione, Aminoisobutyltrimethoxysilane epoxy silanes such as 3-glycidoxypropyltrimethoxysilane, 2-(3,4-epoxycyclohexyl) ethyltrimethoxysilane and 3-glycidoxylpropylmethyldimethoxysilane, vinyl silanes such as 3-methacryloxypropyltrimethoxysilane and Vinyltrimethoxysilane and hydrophobic silanes such as octyltriethoxysilane and hexadecyltrimethoxysilane.

In another aspect, the present invention provides methods of using the binder comprising applying the binder to a substrate and drying and/or curing. In drying (if applied in aqueous form) and curing the curable compositions, the duration, and temperature of heating, will affect the rate of drying, ease of processing or handling, and property development of the treated substrate. Suitable heat treatment temperatures may range 100° C. or more, and up to 400° C. The preferred treatment is substrate dependant. Thermally sensitive substrates such as cellulose fibers may be treated at 130 to 175° C. while thermally less sensitive composites may be treated at 150 to 200° C. and thermally resistant substrates such as mineral fibers may be treated at 220 to 300° C. for the desired times necessary to effect cure. Preferably, heat treatment temperatures range 150° C. or higher; such preferred heat treatment temperatures may range up to 225° C., or, more preferably, up to 200° C. or, up to 150° C. In the methods of use, the composition components need not all be pre-mixed prior to application of the binder to the substrate. For example, one or more components may be applied to a non-woven substrate, followed by application of the other binder components of this invention either in aqueous or dried form. After application, the binder can be cured by heating the coated non-woven to a sufficient temperature where it cures on the substrate.

The binder can be applied to the substrate, such as, for example, a web of fibers, by any suitable means including, for example, air or airless spraying, padding, saturating, roll coating, curtain coating, beater deposition, coagulation or dip and squeeze application, and the resultant saturated wet web laying on a supporting wire or screen is run over one or more vacuum boxes to remove enough binder to achieve the desired binder content in the product or treated substrate.

Drying and curing can be done in two or more distinct steps, if desired. For example, the curable composition can be first heated at temperatures and for times sufficient to at least partially dry, but not fully cure the composition, followed by heating for a second time, at higher temperatures and/or for longer periods of time, to effect curing. Such procedures, referred to as "B-staging," can be used to provide binder treated nonwovens, for example, in roll form, which can be cured later, with or without forming or molding into a particular configuration, concurrent with the curing process.

Suitable substrates for binder application may include, for example, textiles, including cotton, linen, wool, and synthetic textiles from polyester, rayon, or nylon, and superabsorbent fibers; vegetable or cellulosic fibers, such as jute, sisal, flax, cotton and animal fibers; as well as heat resistant substrates, such as metal; plastics; synthetic fibers, e.g. polyester, rayon, poly(acrylonitrile) (PAN), poly(lactic acid) (PLA), poly(caprolactone) (PCL), aramid fibers, polyimide fibers, polyolefins and bi-component fiber comprising two or more fiber-forming polymers such as polypropylene and polyethylene terephthalate; mineral fibers, such as glass and mineral fibers, slag or stonewool, ceramic fibers, metal fibers, carbon fibers, and woven and non-woven fabrics made therefrom; and heat-sensitive substrates, such as wood and woody materials, paper and cardboard.

In yet another aspect, the present invention provides articles comprising substrates treated according to the methods of the present invention.

For each substrate described herein, there exists a corresponding aspect of the present invention wherein the aqueous binder composition in dried or cured form is present in a composite material or product. As defined herein, the term "composite material" refers to materials comprising: (a) a substrate material selected from fibers, slivers, chips, particles, films, sheets, and combinations thereof; and (b) the binder composition of the described embodiment.

Materials used in Examples:

The following materials were used in the Examples that follow:

Dextrose was obtained as dextrose monohydrate from Fischer Scientific (Waltham, Mass.) (CAS #14431-43-7);

1,6 Hexamethylenediamine, 60% in water (NMDA) was obtained from Acros Organics(Geel, Belgium), CAS #124-09-4.

diammonium phosphate (DAP), obtained from Sigma Aldrich (St. Louis, Mo.) (CAS #7783-28-0);

ammonium sulfate (AS), obtained from Fischer Scientific (Waltham, Mass.) (CAS#7783-20-2);

1,4 diaminobutane was obtained from Acros Organics (Geel, Belgium) (CAS #110-60-1);

1,3 cyclohexanebis(methylamine) was obtained from Acros Organics (Geel, Belgium) (CAS #2579-20-6);

sodium hypophosphite telomer of acrylic acid at ambient pH, Mw (wt. average) ~2500 as a 50% solids aqueous solution (SHP-pAA) (Dow Chemical Company, Midland, Mich.);

sodium hypophosphite telomer of methacrylic acid at ambient pH, Mw (wt. average) ~5,000 as a 42% solids w/w aqueous solution (SHP-pMAA) (Dow Chemical Company, Midland, Mich.); and, homopolymethacrylic acid at ambient pH and comparable molecular weight made in the absence of hypophosphite, Mw (wt. average) ~5,000 as a 42.5% solids w/w aqueous solution (pMAA) (Dow Chemical Company, Midland, Mich.); and, GL-675, bromide flame retardant (decabromodiphenyl oxide/antimony trioxide) from Dow Chemical Co. (Midland, Mich.).

Curable compositions were prepared by admixing components of each formulation to provide an aqueous solution. An appropriately sized beaker fastened to laboratory lattice and equipped with a stirring bar and magnetic stirrer was charged with water, followed by diamine, inorganic salt and reducing sugar. The solution is rigorously stirred for 10 minutes to homogeneity and used for padding several cellulose or glass microfiber filter paper sheets. The formulations used are described in Tables 1 and 3, below.

To treat substrates, Whatman #4 microfiber filter sheets (Whatman International Inc., Maidstone, England, GF/A, catalog No. 1820 866, 20.3 cm×25.4 cm) were prepared by drawing the paper through a trough filled with ~300 grams of each 12 wt. % pre-mixed aqueous binder solution, sandwiching the soaked sample between two cardboard sheets to absorb excess binder, and pressing the two cardboard sheets with a Birch Bros. Padder (Birch Brothers inc., Waxham, N.C.) at 68.9Pa pressure and at a speed of 2.5 m/min. Unless otherwise indicated, the resulting sample was dried @ 90° C. for 90 seconds in a Mathis Oven (Werner Mathis AG, Niederhasli/Zurich, Switzerland) vented with a devolatilizer, and then was cured in the same type of Mathis Oven for the time and at the temperature indicated in Table 3, below, immediately after the initial drying. The cured filter paper was then cut into 2.54 cm×10.16 cm strips for tensile testing and 10.26 cm×5.12 cm pieces for flammability testing.

The following test methods were used:

Vertical Flammability Test and Mechanical Integrity of Char/Substrate Method: This test is a modified version of ASTM D3801-10 (Jul. 1, 2010) (ASTM International, West Conshohocken, P). Binder coated Cellulose paper (Whatman #4) sheets were made as described above except they were dried at 90° C. for 90 seconds and cured at 170° C. for 1 minute in a Mathis oven. Each cured substrate was cut into 10.26 cm×5.12 cm (4"×2") sample size and clamped on both sides onto the holder inside the flame test chamber. Once the sample was in place, the flame was slid to the bottom of the sample and kept there until the substrate was lit.

The duration of flame was measured with a stopwatch; a shorter duration is more desirable, with a maximum of 15 seconds being acceptable.

The mechanical integrity of charred substrate was measured as a percent area of the remaining substrate that is suspended by the holder after the burn. Zero percent is intended to state that the substrate completely disintegrated and fell off the holder while 100 percent indicates the substrate charred and retained its shape completely. An integrity result of 55% or more is acceptable; and an integrity result of 65% or more is preferred.

Three trials for vertical flammability and mechanical integrity were run for each example composition; and the results recorded are the average of the three trials.

The overall flammability rating was obtained by multiplying the duration of flame by 100 minus percent mechanical integrity, then divide by 100. If this number was less than one, it was assigned the rating of 1, if between 1 and 3, rating of 2, if between 3 and 5, rating of 3, if between 5 and 10, rating of 4, and if higher than 10, rating of 5. An acceptable rating is 3 or better.

Tensile Testing: Dry binder treated paper test strips were tested as follows: Each strip was mounted on pneumatic grips of a tensile tester (Thwing-Albert Intelect 500 tensile tester (Thwing-Albert Instrument Co, West Berlin, N.J.), and tested with crosshead speed of 2.54 cm/ min. Each tensile strength was recorded as the peak force measured during parting or breaking each tested strip in two. Eight strips were tested per Example. For wet testing, prior to testing, 8 test strips were immersed in 85° C. water for 30 minutes. These samples were then removed from the water, patted dry and immediately tested as per the dry test directions. The above procedure was repeated for all binders formulated in Table 2, with results tabulated in Tables 3 and 4.

% Add On: Determined as the wt. % of binder solids on substrate after cure divided by the bare substrate weight. The weight of the untreated substrate is taken prior to treatment with binder.

TABLE 1

Binder Formulations for Flame Test

| Example | Water (g) | Diamine (g) | Dextrose Monohydrate | poly(acid) | DAP (g) | Other |
|---|---|---|---|---|---|---|
| Blank* | — | — | — | — | — | — |
| A* | 75.2 | HMDA 8.3 | 16.5 | — | — | — |
| B* | 73.5 | HMDA 4.2 | 16.5 | pMAA 5.9 | — | — |
| C* | 79.7 | 1,4 diaminobutane 4.0 | 18.0 | — | — | — |
| D* | 86.5 | HMDA 8.3 | 16.5 | — | — | AS 5.8 |
| E | 78.7 | HMDA 8.3 | 16.5 | — | 0.9 | — |
| F | 89.3 | HMDA 8.3 | 16.5 | — | 0.9 | GL-675 4.4 |
| G | 106 | HMDA 8.3 | 22 | — | 2.9 | — |
| H | 117.3 | HMDA 8.3 | 22 | — | 5.8 | — |
| I | 79.7 | 1,4 diaminobutane 4.0 | 18.0 | — | 0.9 | — |
| J | 78.5 | 1,3 cyclohexane diamine 5.7 | 15.8 | — | 0.9 | — |
| K | 82.1 | HMDA 4.2 | 16.5 | SHP-pAA 5.0 | 1.6 | — |
| L | 77.3 | HMDA 4.2 | 16.5 | SHP-pAA 5.0 | 0.6 | — |
| M | 76.5 | HDMA 4.2 | 16.5 | SHP-pAA 5.0 | 0.4 | — |
| N* | 75.8 | HDMA 4.2 | 16.5 | SHP-pAA 5.0 | 0.3 | — |
| O* | 74.3 | HDMA 4.2 | 16.5 | SHP-pAA 5.0 | — | — |
| P* | 73.4 | HDMA 4.2 | 16.5 | SHP-pMAA 6.0 | — | — |
| Q | 76.7 | HDMA 4.2 | 16.5 | SHP-pMAA 6.0 | 0.7 | — |
| R | 77.9 | HDMA 4.2 | 16.5 | pMAA 5.9 | 0.9 | — |

*Comparative.

TABLE 2

Flame Test Summary

| Example | Molar Ratio of Dextrose to Diamine | Diamine | % Phosphorous or Sulfur on binder (s/s) | Duration of Flame (s) | Mechanical Integrity of Char/Substrate After Burn (0-100%) | Overall Flammability Rating[2] |
|---|---|---|---|---|---|---|
| Blank[3]* | — | — | — | 18 | 0% | 5 |
| A* | 2:1 | HMDA | 0.00% | 15 | 25% | 5 |
| B* | 4:1 | HMDA | 0.00% | 19 | 20% | 5 |
| C* | 2:1 | 1,4 diamino-butane | 0.00% | 13 | 60% | 4 |
| D* | 2:1 | HMDA | 3.0% S | 12 | 50% | 4 |
| E | 2:1 | HMDA | 1.0% P | 9 | 70% | 2 |
| F | 2:1 | HMDA | 1.0% P + Br[1] | 7 | 85% | 1 |
| G | 2.5:1 | HMDA | 2.4% P | 8 | 75% | 2 |
| H | 2.5:1 | HMDA | 4.3% P | 6 | 90% | 1 |
| I | 2:1 | 1,4 diamino-butane | 1.0% P | 10 | 90% | 1 |
| J | 2:1 | 1,3 cyclohexane-bis methylamine | 1.0% P | 9 | 80% | 2 |
| K | 4:1 | HMDA | 2.0% P | 9 | 85% | 2 |
| L | 4:1 | HMDA | 1.0% P | 12 | 75% | 2 |
| M | 4:1 | HMDA | 0.8% P | 13 | 70% | 3 |
| N* | 4:1 | HMDA | 0.6% P | 13 | 60% | 4 |
| O* | 4:1 | HMDA | 0.3% P | 11 | 25% | 4 |
| P* | 4:1 | HMDA | 0.2% P | 11 | 25% | 4 |
| Q | 4:1 | HMDA | 1.0% P | 10 | 55% | 3 |
| R | 4:1 | HMDA | 1.0% P | 13 | 70% | 3 |

[1]GL-675, bromide flame retardant (decabromodiphenyl oxide/antimony trioxide) from Dow Chemical (Midland, MI), added 15% s/s on binder;
[2](1-5, 1 Best, 5 Worst) 3 is acceptable;
[3]Whatman #4 Cellulose Paper (Whatman International Ltd., Maidstone, England).

In the Examples E to M, Q and R shown above in Table 2, the formulations having at least 0.8% phosphorus (s/s) give excellent to good flame retardation.

As shown in Table 2, above, the formulations in the Blank and in Examples A, B, C, and D, having no added phosphorous provided very poor flame abatement. The addition of flame retardant formulation containing both Br and P as in Example F stifled flame propagation and displayed good substrate integrity after flame exposure. The addition of phosphorous either from polymer bound hypophosphite or added phosphate in amounts of less than 0.7% (s/s) in Examples N, O and P provided an inadequate overall flame retardancy rating and inadequate to marginally acceptable substrate integrity after flame exposure The addition of phosphorous either from polymer bound hypophosphite or added phosphate provided maintenance of substrate integrity and flame abatement as shown by the formulations of Examples E to M having greater than 0.7% Phosphorous (s/s).

To address concerns regarding water durability raised by the intentional addition of phosphate salts to abate flame propagation, binder formulations described in Table 3, below were prepared and their hot wet tensile evaluated according to the method described by 'Treatment of Whatman #4 Cellulose Paper with Test Binder'.

TABLE 3

Binder Formulations for Hot-Wet Tensile

| Example[1] | Water (g) | HDMA (g) | Dextrose Monohydrate (g) | poly(acid) (g) | diammonium phosphate (g) | % P (s/s) |
|---|---|---|---|---|---|---|
| 1* | 125.6 | 6.7 | 13.2 | — | — | — |
| 2* | 124.9 | 3.3 | 13.2 | pAA 4 | — | 0.3 |
| 3 | 124.5 | 1.3 | 13.2 | pAA 6.4 | — | 0.5 |
| 4 | 126.9 | 3.3 | 13.2 | — | 2.0 | 2.9 |
| 5* | 124.2 | 3.3 | 13.2 | pMAA 4.8 | — | 0.2 |
| 6 | 129.3 | 3.3 | 13.2 | pAA 4 | 0.49 | 1.0 |
| 7 | 129.0 | 3.3 | 13.2 | pMAA 4.8 | 0.54 | 1.0 |

[1]Example 1 is equivalent to Example A from Table 1 and 2, above, on a solids basis; Example 2 is equivalent to Example "O" from Table 1 and 2; Example 5 is equivalent to Example "P" from Table 1 and 2; Example 6 is equivalent to Example L from Table 1 and 2; and Example 7 is equivalent to Example Q from Table 1 and 2;
*Comparative.

TABLE 4

Hot-Wet Tensile Summary

| | Ex. 1* (0% SHP-pAA) | Ex. 2 (12.5% SHP-pAA) | Ex. 3 (20% SHP-pAA) | Ex. 4* (12.5% DAP) | Ex. 5 (12.5% SHP-pMAA) | Ex. 6[1] (12.5% SHP-pAA + DAP) | Ex. 7[1] (12.5% SHP-pMAA + DAP) |
|---|---|---|---|---|---|---|---|
| Hot-Wet Retention (190 C., 1 min) | 60% | 52% | 33% | 48% | 44% | 46% | 48% |
| Hot-Wet Retention (190 C., 3 min) | 71% | 66% | 68% | 51% | 63% | 60% | 61% |

[1]Examples 6 and 7 have DAP added to Example 2 and Example 5, respectively, to result in 1% P (s/s);
*Comparative.

The Examples 1 to 7 shown in Table 4, above were subject to Hot-Wet Tensile testing, as follows:

Whatman Glass Filter Paper (Whatman International Inc., Maidstone, England, GF/A, catalog No. 1820 866, 20.3 cm×25.4 cm) was treated with the binder by padding, as described above to a target add-on of 20% of the filter paper (s/s), then dried at 90° C. for 90 seconds and cured as indicated above in Table 4, both in a Mathis oven. Tensile strength is measured by cutting the filter paper and testing in a Thwing-Albert Intelect 500 Tensile tester (Philadelphia, Pa.). The resulting % is calculated as follows:

Hot wet tensile %=wet-tensile/dry tensile×100

An acceptable hot wet tensile %, for good durability hot wet tensile strength in fully cured formulations (3 min at 190° C.) should exceed 50% of the dry tensile.

As shown in Table 4, above, the formulations that derive their phosphorous content solely from phosphate salts have faltering hot-wet tensile, see Example 4. Formulation having their P content derived from Phosphorous bound to a polymeric polyacid solution polymer as in Examples 2, 3 and 5 of Table 4, above, display more than acceptable hot-wet tensile % when fully cured. Example 1, which is the same as Example A in Table 2, gives inadequate flame retardation but good hot wet tensile. The combination of flame abatement and good durability is available from a balance of phosphorous derived from phosphate and phosphorous bound to polymeric polyacid solution polymer.

We claim:

1. An aqueous thermosetting binder composition comprising i) from 50 to 87 wt. %, based on total solids, of reducing sugar, ii) diprimary diamine or polyprimary amine in a ratio of from 1.1:1 to 0.3:1 moles of primary amine per mole of the reducing sugar, the ratio based on solids iii) from 0.5 to 15 wt. %, based on total solids, of a phosphorus acid salt which is a divalent metal salt, an alkali metal salt, ammonium tripolyphosphate, diammonium hydrogen phosphate, or ammonium pyrophosphate, and iv) from 3 to 20 wt. %, based on total solids, of an aqueous polymeric polyacid solution polymer containing phosphorus or its salt, wherein the aqueous thermosetting binder composition comprises from 0.7% P (s/s) to 5% P (s/s).

2. The composition as claimed in claim 1, wherein the composition comprises at least 1.0% P (s/s).

3. The composition as claimed in claim 1, wherein the aqueous polymeric polyacid comprises a polyacrylic acid or a polymethacrylic acid with a phosphinate endgroup.

4. The composition as claimed in claim 1, further comprising from 0.02 to 5 wt %, based on total solids, of a non-phosphorus containing flame retardant.

5. The composition as claimed in claim 1, further comprising one or more stabilizer acid or salt having a pKa of 8.5 or less.

6. The composition as claimed in claim 1, wherein the one or more reducing sugar is a 5-carbon or a 6-carbon monosaccharide.

7. A method of using the aqueous thermosetting binder composition as claimed in claim 1 comprising applying the binder compositions to or mixing them with a substrate and then heating the thus treated substrates or mixtures to cure the binder at from 100 to 400° C.

8. The method of claim 7 wherein the substrates include fibers, slivers, chips, particles, and combinations thereof.

9. The method of claim 8, wherein the substrate includes glass, glass fiber, stone fibers, composites and composite fibers.

10. A fiber matt containing a cured binder resulting from applying the compositions of claim 1 thereto, wherein the density of the fiber matt is from 5 kg/m³ to 220 kg/m³.

* * * * *